United States Patent [19]
Ota et al.

[11] Patent Number: 4,772,575
[45] Date of Patent: Sep. 20, 1988

[54] METHOD OF MANUFACTURING SINTERED COMPACT OF CUBIC BORON NITRIDE

[75] Inventors: Nobuhiro Ota; Hitoshi Sumiya; Shuji Yazu, all of Itami, Japan

[73] Assignee: Sumitomo Electric Industries, Ltd., Osaka, Japan

[21] Appl. No.: 33,170

[22] Filed: Mar. 31, 1987

[30] Foreign Application Priority Data

Apr. 9, 1986 [JP] Japan .................. 61-83146
Feb. 27, 1987 [JP] Japan .................. 62-46499

[51] Int. Cl.$^4$ ............................ C04B 35/58
[52] U.S. Cl. ........................ 501/96; 423/290
[58] Field of Search .............. 501/96, 123, 121; 423/290

[56] References Cited

U.S. PATENT DOCUMENTS

| 2,947,617 | 8/1960 | Wentorf | 501/96 |
| 3,212,852 | 10/1965 | Bundy | 501/96 |
| 4,188,194 | 2/1980 | Corrigan | 501/96 |
| 4,349,517 | 9/1982 | Lysanov et al. | 423/290 |
| 4,469,802 | 9/1984 | Endo et al. | 501/96 |

FOREIGN PATENT DOCUMENTS

| 13731 | 8/1966 | Japan . |
| 128700 | 11/1976 | Japan . |
| 33510 | 3/1979 | Japan . |
| 5547 | 2/1984 | Japan . |
| 57967 | 4/1984 | Japan . |
| 57966 | 4/1984 | Japan . |
| 38164 | 9/1984 | Japan . |
| 38165 | 9/1984 | Japan . |
| 2625 | 1/1986 | Japan . |

OTHER PUBLICATIONS

Mat. Res. Bull., vol. 7, 999–1004, 1972, Pergamon Press, Inc., M. Waktsuki et al. "Synthesis of Polycrystalline Cubic Bn".
Mat. Res. Bull., vol. 9, pp. 1443–1446, 1974, Pergamon Press Inc., K. Susa et al. "Catalytic Effect of Water the Synthesis of Cubic BN".

Primary Examiner—Steven Capella
Assistant Examiner—David M. Brunsman
Attorney, Agent, or Firm—W. G. Fasse; D. H. Kane, Jr.

[57] ABSTRACT

A sintered compact of cubic boron nitride is made by adsorbing and/or diffusing 0.005 to 1.000 percent by weight of water into a boron nitride compact containing alkaline earth metal boron nitride as a catalyst. The so prepared compact is then subjected to a treatment under high pressure at a relatively low temperature to form a dense cubic boron nitride sintered compact of high purity.

7 Claims, 2 Drawing Sheets

METHOD OF MANUFACTURING SINTERED COMPACT OF CUBIC BORON NITRIDE

BACKGROUND OF THE INVENTION

1. Field of the Invention

The present invention relates to a method of manufacturing a sintered compact of cubic boron nitride employed as a tool or a heat sink material for example, and more particularly, it relates to a method of manufacturing a sintered compact of cubic boron nitride, hereinafter referred to as a cBN sintered compact, from hexagonal boron nitride, hereinafter referred to as hBN.

2. Description of the Prior Art

The cBN has a hardness that is almost the same as the hardness of diamond. While diamond is oxidized and exhausts upon reaction with iron family elements when heated at a temperature within a range of 700° to 800° C. or more, cBN is not oxidized, hardly converted into hBN and does not react with any member of the iron family even under a high temperature in the range of 1100° to 1300° C. Thus, cBN is chemically and thermally extremely stable, and suitable as a material for grinding a member of high-speed steel, alloy or cast iron having a substrate of nickel or cobalt etc., which cannot be ground by diamond. Further, cBN is next to diamond and by far higher than copper, in heat conductivity, whereby the same is also suitable for a heat sink material. A cBN sintered compact for the aforementioned usage is preferably of high purity and high density with no admixture or with an extremely small amount of admixture.

However, it is extremely difficult to directly sinter cBN powder and hence metal, carbide, oxide or nitride must be generally admixed to the same as a binder, whereby the sintered compact is made non-uniform in its structure and its mechanical strength and thermal stability is extremely reduced, while the heat conductivity is remarkably lowered.

In order to solve the aforementioned problems, the following cBN sintering methods are known:

U.S. Pat. No. 3,212,852 and Japanese Patent Publication Gazette No. 13731/1966 discloses a method of directly converting an hBN material into cBN without admixing a catalyst or binder, to obtain a dense cBN sintered compact. However, this method requires superhigh pressure and temperature conditions in excess of 100 Kbar and 2000° C., and the product obtained is considerably restricted in configuration. Japanese Patent Publication Gazette No. 2625/1986 also discloses a method of directly converting hBN into cBN, which method requires operation under a high temperature in excess of 1600° C., leading to difficulty in production.

On the other hand, U.S. Pat. Nos. 4,188,194 and 2,947,617 and Japanese Patent Laying-Open Gazette No. 33510/1979 disclose a method of directly converting a material of pyrolytic boron nitride (pBN) into cBN, thereby to obtain a cBN sintered compact. However, pBN is still partially unknown in structure and the same is prepared by chemical vapor deposition through thermal decomposition of $BCl_3$ and NH gas, whereby the cost is increased. Further, this method requires high-temperature processing under a temperature in excess of 1800° C. as described in Japanese Patent Laying-Open Gazette No. 33510/1979, leading to a problem in manufacturing.

Japanese Patent Laying-Open Gazette No. 128700/1976 discloses a method of directly converting a material of wurtzite boron nitride, hereinafter referred to as wBN, which is a high-pressure phase BN, into a cBN sintered compact. However, since wBN is generally in a thermodynamically unstable, non-equilibrium state, the state of the material must be controlled with a high accuracy. Such strict control of the material state is extremely difficult in practice, and hence hBN or wBN is deposited in the obtained cBN sintered compact whereby the product quality becomes irregular.

On the other hand, a method of manufacturing a cBN sintered compact containing no bonding phase with relatively relaxed conditions at a low cost is described in, for example, a report by Wakatsuki et al. in "Material Research Bulletin", Vol. 7, 1972, p. 999. In this method, a cBN sintered compact is obtained by directly converting a parent material of low-crystalline hexagonal boron nitride hBN. However, the low-crystalline hBN employed as the parent material is chemically unstable and it reacts easily with oxygen in the air, and hence it is difficult to obtain a compact uniformly and sufficiently sintered as a whole.

It is well known in the art that cBN can be obtained by superhigh pressure and temperature processing of an hBN material under presence of a catalyst. Typical examples of such a catalyst are alkaline metal, alkaline earth metal and nitride thereof. A method of synthesizing cBN from hBN in a relatively low temperature condition with a catalyst of water is described in "Material Research Bulletin", Vol. 9, 1974, p. 1443, Susa et al. In this method employing water as a catalyst, however, a dense sintered compact having interparticle bonding cannot be obtained since borate is generated and the cBN is extremely small in particle size.

Japanese Patent Publication Nos. 38164/1984 and 38165/1984 disclose alkaline earth metal boron nitride such as magnesium boron nitride, strontium boron nitride and barium boron nitride as catalysts for converting hBN into cBN. Further, Japanese Patent Publication No. 5547/1984 and Japanese Patent Laying-Open No. 57967/1984 describe a method of performing a superhigh pressure and temperature processing on an hBN sintered compact carrying a small amount of alkaline earth metal boron nitride as disclosed in Japanese Patent Laying-Open No. 57966/1984 at a temperature in excess of 1350° C. However, this method requires high-temperature operation at a temperature in excess of 1350° C., and hence considerably high temperature processing is required in order to internally homogeneously sinter a large-sized sample. If the temperature control is incorrectly performed at such high temperature processing, unsintered parts are left in the sintered compact. Thus, it has been difficult to obtain a dense sintered compact.

SUMMARY OF THE INVENTION

An object of the present invention is to provide a method of manufacturing a dense cBN sintered compact of high purity under relatively low temperatures.

In order to attain the object, the present invention is characterized in that a compact of boron nitride is made to carry alkaline earth metal boron nitride, wherein 0.005 to 1.000 percent by weight of water is adsorbed and diffused in the boron nitride compact containing the alkaline earth metal boron nitride, and temperature and pressure processing steps are performed under thermodynamically stable conditions for cubic boron nitride.

According to the present invention, the following effects are attained:

(1) A dense and homogenous cBN sintered compact can be readily manufactured under conditions advantageous for industrial production with an excellent reproducibility.

(2) A cBN sintered compact superior in mechanical characteristics to the conventional one can be obtained for use in making cutting tools or the like.

(3) A sintered compact having a high heat conductivity of 6 to 7 W/cm·°C. and over at the room temperature can be obtained, to provide an optimal material for use as a heat sink.

These and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
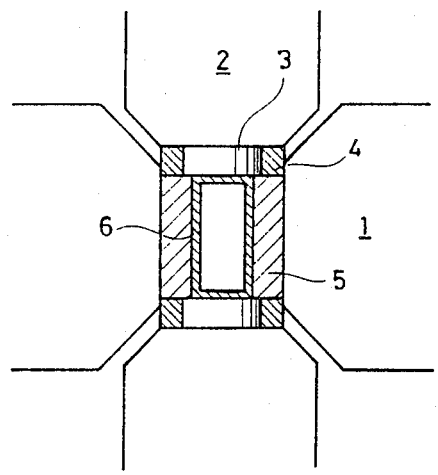
FIG. 1 is a schematic sectional view showing an example of a girdle type superhigh pressure generating apparatus employed for carrying out the present invention.

Hexagonal boron nitride for carrying alkaline earth metal boron nitride, can be prepared as an hBN compact or as hBN powder.

The hBN or its equivalent must be of high purity containing impurities, particularly $B_2O_3$, in quantities that are as small as possible. The alkaline earth metal boron nitride can be introduced into the hBN compact in different ways, for example by (a) mixing hBN powder and alkaline earth metal boron nitride powder in an atmosphere of an anhydrous inert gas, particularly of nitrogen gas, and pressurizing and molding the same in an inert atmosphere, or (b) by diffusing alkaline earth metal boron nitride in an hBN compact body formed by cold pressing or sintering hBN powder in a contact or noncontact manner in a nitrogen current. The hBN compact carrying the alkaline earth metal boron nitride can be obtained by either the method (a) or the method (b). The method of thermally diffusing the alkaline earth metal boron nitride in the hBN compact in a contact state in a nitrogen current is preferable since a homogenous support having a large content of catalyst can be readily obtained. In this case, the content can be controlled by controlling the density of the hBN compact material, the temperature, and the time of heating for the thermal diffusion.

The content of the catalyst must be within a range of 0.01 to 5.0 mol % in case of expressing the alkaline earth metal boron nitride by $Me_3B_2N_4$ (Me=alkaline earth metal). When the content is less than 0.01 mol %, a dense cBN sintered compact cannot be obtained because of partially unconverted hBN. When the content is in excess of 5.0 mol % to the contrary, the catalyst is non-uniformly dispersed and holes are defined by the catalyst remaining in the cBN sintered compact as obtained, whereby a dense cBN sintered compact cannot be obtained.

In order to cause the hBN compact carrying the alkaline earth metal boron nitride, to carry more water, the hBN compact may be placed in a closed vessel maintained in a constant temperature and humidity for a constant period so that water is stably and quantitatively adsorbed and diffused in the compact. The adsorption of water, which can be evaluated by increase in weight, must be within a range of 0.005 to 1.000 percent by weight of the hBN compact carrying the alkaline earth metal boron nitride. When the adsorption of water is less than 0.005 wt. %, water molecules are not sufficiently diffused in the alkaline earth metal boron nitride contained in the hBN compact to attain the object, whereby a dense sintered compact cannot be obtained since unconverted hBN remains in the sintered compact. When the adsorption of water is in excess of 1.000 wt. %, the alkaline earth metal boron nitride carried in the hBN compact is hydrolyzed to deposit large amounts of alkaline earth metal hydroxide and boric acid which are harmful for the formation of cBN since they inhibit the conversion from hBN to cBN, whereby unconverted parts remain in the sintered compact as the result.

Sintering must be performed at a temperature of 1200° C. or more under cBN-thermodynamically stable conditions. Under these cBN forming conditions, the pressure value is based on a press external pressure-pressure curve created with pressure fixed points, namely 2.55, 3.7 and 5.5 GPa. These points are phase transition points caused by pressure changes of bismuth, thallium and barium under a normal temperature.

The sintering temperature was measured through a platinum-platinum rhodium thermocouple and evaluated with reference to the electric power applied to a graphite heater.

Referring to FIG. 1 showing an example of a superhigh pressure apparatus for carrying out the method according to the present invention, the girdle type superhigh pressure generating apparatus comprises a cylinder 1, a piston 2, an energizing tablet 3, a ring-shaped pressure medium 4, a cylindrical pressure medium 5 and a graphite heater 6. The piston 2 applies an AC or DC current to the graphite heater 6 through the energizing tablet 3 for heating. The apparatus for carrying out the inventive method is not restricted to that shown in FIG. 1, but a well-known superhigh pressure generating apparatus such as a belt type device can be employed so far as pressure and temperature conditions required for cBN formation can be obtained.

In a process of manufacturing a cBN sintered compact, a constant amount of water is effectively admixed to an alkaline earth metal boron nitride (1) to remarkably improve the catalytic function of the alkaline earth metal boron nitride, (2) to suppress abnormal growth of cBN particles and (3) to prompt sintering of cBN particles. Namely, a constant amount of water is diffused in and/or admixed to an hBN compact carrying alkaline earth metal boron nitride, whereby a dense cBN sintered compact of high purity, in which particles are strongly bonded to each other, can be readily obtained under a low temperature condition. The obtained cBN sintered compact is remarkably improved in its characteristics such as its heat conductivity.

Figure 2:
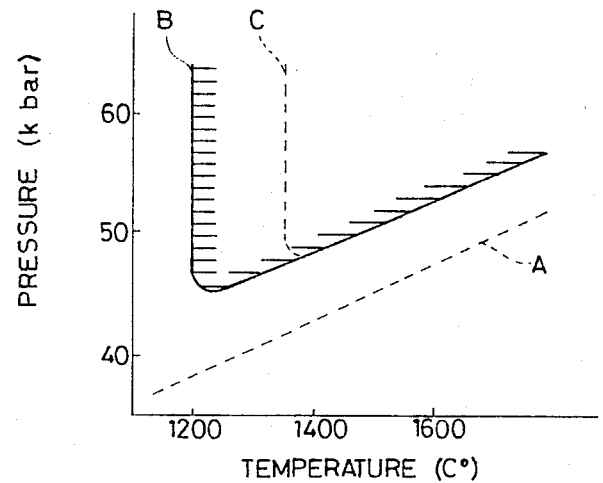
FIG. 2 illustrates cBN generating regions in a pressure temperature diagram.

FIG. 2 shows the cBN synthesizing region according to the present invention. Referring to FIG. 2, the line A denotes an hBN-cBN equilibrium curve, and the area above the line A is a cBN-stable region while the area below line A is an hBN-stable region. Line B denotes a cBN forming region according to the present invention, and line C denotes a cBN generating region if water is not admixed under conditions identical to those of the present invention. It is clear from FIG. 2 that the cBN generating region is extended, more specifically the temperature range is lowered by about 150° C., if 0.005 to 1.000 wt. % of water are adsorbed and/or diffused. It has been found that particles ar strongly bonded to each other in the cBN sintered compact obtained under this condition, to substantially reach theoretical density of cBN as may be seen from the examples described below. Thus, a dense cBN sintered compact can be manufactured under lower pressure and temperature conditions as compared with the prior art, by adding 0.005 to 1.000 wt. % of water.

By such admixture of a small amount of water, the range of the content of the catalyst required for obtaining a dense cBN sintered compact, i.e., the content of the alkaline earth metal boron nitride to be carried in the hBN compact, is widened as compared to the case wherein water is not admixed. More specifically, at least 0.1 to 0.2 mol % of the catalyst must be admixed in the case of admixing no water. However, a dense and homogenous cBN sintered compact can be obtained with a minimum of 0.01 mol % of the catalyst by admixing 0.005 to 1.000 wt. % of water. Thus, a cBN sintered compact of high purity having an extremely small residual amount of the catalyst can be manufactured by reducing the catalyst content to the utmost to, e.g., 0.01 to 0.1 mol %. However, no generation of cBN was observed in case where the catalyst content was less than 0.01 mol % or no catalyst was admixed, even if 0.005 to 1.000 wt. % of water was admixed, please see Example 3. Several percent to several ten percent of water must be admixed in order to convert hBN into cBN if the catalyst is water alone. In this case, a large amount of borate is produced and the cBN particle size is extremely small as hereinabove described, whereby a strong sintered compact with an interparticle bonding cannot be obtained.

The small amount of water is also adapted to suppress abnormal growth of cBN particles while prompting sintering reaction between the cBN particles. If sintering is performed with no admixture of water when a large amount of catalyst is admixed or the sintering temperature is too high, the sintered compact becomes heterogenous in its structure with local deposition of coarse cBN particles of several ten $\mu$m in particle size. In this case, the mechanical characteristics such as hardness and toughness are lowered. On the other hand, a homogenous cBN sintered compact having regular particles can be obtained with excellent reproducibility by admixing 0.005 to 1.000 wt. % of water. In this case, further, the cBN particles are strongly bonded to each other as compared with the case of admixing no water, with less disadvantages such as cracking after sintering or in working and droppage of the particles. Thus, the mechanical characteristics of the cBN sintered compact can be extremely improved by admixing 0.005 to 1.000 wt. % of water.

The heat conductivity is one of the important characteristics of a cBN sintered compact employed as a heat sink material. According to the present invention, a highly heat-conductive cBN sintered compact having a heat conductivity of 6 to 7 W/cm·°C. or more at room temperature can be stably manufactured by admixing a constant amount of water to the material. Namely, a BN compact is made to carry 0.1 to 2.0 mol % of catalyst in the form of alkaline earth metal boron nitride and 0.05 to 0.3 wt. % of water is diffused in and/or admixed to the same to be processed at a temperature of 1400° C. or more in a cBN-stable region, thereby to obtain a highly heat-conductive cBN sintered compact having a heat conductivity of 6 W/cm·°C. or more at room temperature. The content of the catalyst is 0.1 to 2.0 mol % for the following reasons. When the catalyst content is less than 0.1 mol %, the size of the particles in the obtained cBN sintered compact is small about 1 $\mu$m or less, whereby mean free paths for phonons are decreased to lower the heat conductivity. The cB unit particle size is increased and the heat conductivity is improved as the catalyst content is increased. However, a large amount of catalyst remains in the cBN grain boundaries when the catalyst content is in excess of about 2.0 mol %, which residual catalyst serves as a phonon scattering source to again lower the heat conductivity. Thus, the catalyst content must be within a range of 0.1 to 2.0 mol %, most appropriately of about 1.0 mol %, in order to manufacture a cBN sintered compact of high heat conductivity.

Figure 4:
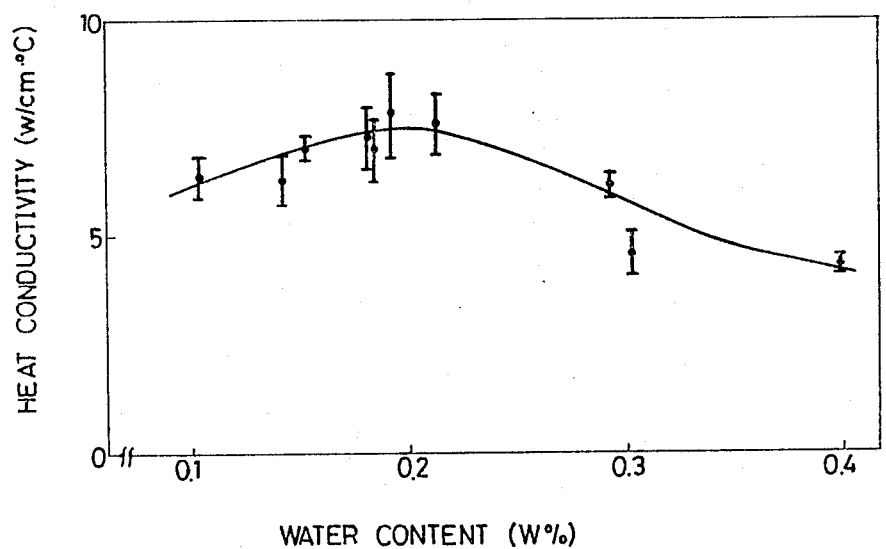
FIG. 4 is a graph showing the heat conductivity of cBN sintered compacts as a function of the content of water admixed to materials of hBN used to produce cBN sintered compacts, at room temperature based on Example 4.

In order to manufacture such a cBN sintered compact of high heat conductivity of 6 W/cm·°C. or more, the water content must be within a range of 0.05 to 0.3 wt. % for the following reason. FIG. 4 shows the measured heat conductivity of various cBN sintered compacts prepared by admixing 1.0 mol % of magnesium boron nitride ($Mg_3B_2N_4$) to hBN compacts with various water contents as shown in Example 4. It is clear from FIG. 4 that the cBN sintered compacts having water contents within a range of 0.05 to 0.3 wt. % show a high heat conductivity value of 6 W/cm·°C. or more. When the water content is small, the aforementioned effect of the water on the sintering reaction is so insufficient that the cBN particles are partially insufficiently bonded to each other, whereby the heat conductivity is lowered. However, if the water content is excessive, a large amount of oxide, particularly MgO is deposited in the cBN grain boundaries to serve as a phonon scattering source, leading to a reduction in the heat conductivity. Thus, the water content is preferably within a range of 0.05 to 0.3 wt. %, most appropriately of about 0.15 to 0.20 wt. % in order to manufacture a cBN sintered compact of high heat conductivity. Further, the sintering temperature must be of 1400° C. or more for manufacturing a cBN sintered compact of high heat conductivity. When the sintering temperature is lower, the cBN particle size is reduced to lower the heat conductivity. The cBN particle size is increased with increase in sintering temperature, to improve heat conductivity.

EXAMPLE 1

An hBN sintered compact having a bulk density of 1.8 g/cm$^3$ and a high purity containing no binder, was refined until the content of $B_2O_3$ was less than 0.03 wt. % by processing in high purity nitrogen gas at 2050° C. for two hours. This hBN sintered compact was embedded in magnesium nitride powder to be heated in high purity nitrogen gas at 1165° C. for 12 hours. After the heat treatment, the hBN sintered compact was subjected to chemical analysis and X-ray analysis, whereby it was found that the $Mg_3B_2N_4$ was uniformly dispersed in the hBN sintered compact, and the amount thereof was 1.10 mol %.

The hBN sintered compact containing $Mg_3B_2N_4$ thus obtained was placed on a water covered surface of a closed vessel containing water and maintained at a temperature of 25° C. for 45 minutes, to adsorb a small amount of water. The amount of the adsorbed water was measured on the basis of the weight change of the sample, to find that 0.151 wt. % of water was adsorbed and/or diffused in the hBN sintered compact containing $Mg_3B_2N_4$.

Figure 3:
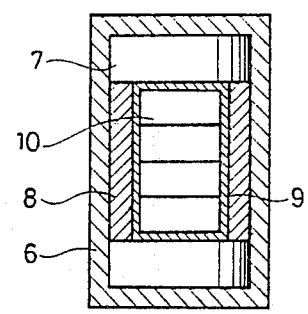
FIG. 3 is a sectional view for illustrating the structure of a sample employed in the apparatus of FIG. 1.

This sample was constructed as shown in FIG. 3, wherein a graphite heater 6 encloses NaCl disks 7 above and below an NaCl cylinder 8 surrounding a molybdenum vessel 9 holding a sample 10. Then the sample 10 was placed in the girdle type superhigh pressure/temperature generating apparatus as shown in FIG. 1, to be subjected to superhigh pressure of 5.0 GPa and to a temperature of 1250° C. for 30 minutes.

Thus, a pale green translucent strong sintered compact was obtained, which was recognized as a cBN unit layer by X-ray analysis. The surface of this cBN sintered compact was observed through a scanning type electron microscope (SEM) and it was found that relatively regular cBN particles of 3 to 5 μm in particle size were densely bonded to each other.

The cBN sintered compact had a high heat conductivity of 6.1 W/cm·°C. and a Vickers hardness of 6000 to 6500 Kg/mm² at room temperature. The density was 3.47 g/cm³, which was substantially equal to the theoretical value. For the purpose of comparison, $Mg_3B_2N_4$ was admixed in a similar content of 1.15 mol % to an hBN sintered compact similarly to the above, to be subjected to superhigh pressure and temperature processing under the same conditions as the above except that there was no admixture of water. This compact remained hBN with no formation of cBN.

EXAMPLE 2

$Mg_3B_2N_4$ and water were admixed to an hBN sintered compact under the same conditions as Example 1. The contents of $Mg_3B_2N_4$ and water were 1.14 mol % and 0.157 wt. % respectively. This sample forming a starting or a parent material was subjected to superhigh pressure of 5.5 GPa and a temperature of 1500° C. for 30 minutes, similarly to Example 1.

Thus, an extremely dense cBN sintered compact was obtained consisting of only cBN particles of relatively regular particle sizes of 5 to 8 μm and having a density reaching the theoretical value. The heat conductivity of this cBN sintered compact was 6.4 W/cm·°C. and its Vickers hardness was 6500 to 7500 Kg/mm².

For the purpose of comparison, a cBN sintered compact was prepared under the same conditions as the above except that no water was admixed. Although a dense sintered compact of a cBN unit phase was obtained, a large amount of cracking was recognized. The structure of this compact was observed through the SEM, whereby particles were observed having particle sizes within the range of 1 to 10 μm. The particles were rather irregular but bonded to each other. An uncracked part of the sample was cut to measure a heat conductivity of 4.5 W/cm·°C. and a hardness of 5000 to 6500 Kg/mm², which are lower values as compared with Example 1.

EXAMPLE 3

$Mg_3B_2N_4$ and water were admixed to an hBN sintered compact similarly to Example 1. The processing time for admixing $Mg_3B_2N_4$ was reduced to 30 minutes. As a result, the content of $Mg_3B_2N_4$ was reduced to about 0.06 mol %. It has been confirmed through EPMA that a small amount of the admixed $Mg_3B_2N_4$ was uniformly dispersed in the hBN sintered compact. 0.05 wt. % of water was admixed to the hBN sintered compact containing the small amount of $Mg_3B_2N_4$. The processing time for admixing water was 12 minutes. This sample was used as a starting material and subjected to a superhigh pressure of 5.5 GPa and to a temperature of 1450° C. for 30 minutes similarly to Example 1.

As a result, a dense sintered compact substantially consisting of only cBN particles was obtained with an extremely fine average unit particle size of 1 to 2 μm. No $Mg_3B_2N_4$ or MgO was detected through chemical analysis, and the cBN sintered compact was of extremely high purity. Although the heat conductivity of 5.2 W/cm·°C. was slightly lower than in Example 1, this sintered compact had a higher Vickers hardness of 7000 to 7500 Kg/mm² and a high bending resistance of 100 to 120 Kg/mm². These are excellent mechanical characteristics.

For the purpose of comparison, 0.06 mol % of $Mg_3B_2N_4$ was admixed to an hBN sintered compact to be subjected to a superhigh pressure and a temperature for processing under the same conditions as the above except that the admixture of water was omitted, whereby the compact remained hBN with no generation of cBN. Further, only water was admixed to hBN sintered compacts with no admixture of $Mg_3B_2N_4$ to be subjected to a superhigh pressure of 5.5 GPa and a temperature of 1450° C. for 30 minutes, whereby no cBN formation was recognized for water contents of 0.05, 0.153 and 0.5 wt. %.

EXAMPLE 4

About 1.0 mol % of $Mg_3B_2N_4$ was admixed to nine hBN sintered compacts similarly to Example 1. Then, samples having different water contents were prepared by changing the processing times for admixing water. These nine samples were used as starting materials and subjected to a superhigh pressure of 5.0 GPa and a temperature of 1450° C. for 30 minutes similarly to Example 1.

Table 1 shows the result of the measurement of the heat conductivity (W/cm·°C.) and of the Vickers hardness (Kg/mm²) of the cBN sintered compacts thus obtained. The measurements were made at room temperature. FIG. 4 also shows the measured heat conductivity in its dependence on the water content.

TABLE 1

| | Starting Material | | | |
|---|---|---|---|---|
| No. | $Mg_3B_2N_4$ Content (mol %) | Water Content (wt. %) | Heat Conductivity (W/cm · °C.) | Vickers Hardness (Kg/mm²) |
| 1 | 1.02 | 0.102 | 6.3 | 6000~6500 |
| 2 | 1.05 | 0.142 | 6.2 | 6000~7000 |
| 3 | 1.08 | 0.153 | 6.9 | 5500~6000 |
| 4 | 0.98 | 0.182 | 7.3 | 5500~6000 |
| 5 | 1.01 | 0.184 | 7.0 | 5500~6000 |
| 6 | 1.02 | 0.192 | 7.8 | 5000~6000 |
| 7 | 0.95 | 0.213 | 7.5 | 5500~6000 |
| 8 | 1.05 | 0.293 | 6.1 | 4500~5500 |
| 9 | 0.96 | 0.302 | 4.6 | 4000~4500 |

TABLE 1-continued

| | Starting Material | | | |
|---|---|---|---|---|
| No. | $Mg_3B_2N_4$ Content (mol %) | Water Content (wt. %) | Heat Conductivity (W/cm · °C.) | Vickers Hardness (Kg/mm²) |
| 10 | 1.02 | 0.400 | 4.3 | 4000~4500 |

It is understood that the cBN sintered compact of the invention has a high heat conductivity of 6 W/cm·°C. or more with the water content about 0.3 wt. % or less, and particularly that containing 0.15 to 0.25 wt. % of water shows an extremely high heat conductivity value of 7 W/cm·°C. The hardness is decreased with an increase in water content, to less than 5000 Kg/mm² with the water content in excess of about 0.3 wt. %.

It has been recognized through X-ray analysis that a slight amount of MgO was generated in the cBN sintered compact when the water content exceeded 0.3 wt. %.

EXAMPLE 5

An hBN powder material of 5 to 10 μm in particle size containing 0.2 wt. % of $B_2O_3$ was compacted by a cold isostatic pressing method (CIP), to prepare an hBN compact. This hBN compact was refined in high purity nitrogen gas at 2050° C. for two hours, to obtain a high purity hBN compact of 1.7 g/cm³ in bulk density containing less than 0.03 wt. % of $B_2O_3$. $Mg_3B_2N_4$ was admixed for 210 minutes and water was admixed for 30 minutes to the hBN compact similarly to Example 1, to obtain a parent or starting material containing 1.15 mol % of $Mg_3B_2N_4$ and 0.18 wt. % of water. This starting material was subjected to superhigh pressure and temperature under the same conditions as in Example 1, to obtain a cBN sintered compact similar to that of Example 1.

The cBN sintered compact thus obtained had a heat conductivity of 6.2 W/cm·°C. and a Vickers hardness of 6000 to 6500 Kg/mm².

EXAMPLE 6

An hBN sintered compact identical to that in Example 1 was embedded in strontium nitride powder and then retained in nitrogen gas at 1150° C. for 12 hours. The hBN sintered compact was subjected to chemical analysis and X-ray analysis showing that 1.05 mol % of $Sr_3B_2N_4$ was uniformly dispersed in the hBN sintered compact. 0.11 wt. % of water was admixed to the hBN sintered compact under conditions similar to those of Example 1.

The sample thus obtained was constructed as shown in FIG. 3, to be subjected to superhigh pressure of 4.8 GPa and to a temperature of 1200° C. in an apparatus as shown in FIG. 1 for 30 minutes.

X-ray analysis and chemical analysis has shown that this sample was a high purity cBN sintered compact. The section of this sample was observed through an SEM showing that particles were strongly bonded to each other to provide a dense sintered compact, which was 3.47 in density equally to the theoretical value of cBN. This sample had a heat conductivity of 6.2 W/cm·°C. and a Vickers hardness of 5500 to 6500 Kg/mm².

EXAMPLE 7

An hBN sintered compact including $Ca_3B_2N_4$ was prepared under the same conditions as Example 6. The content of $Ca_3B_2N_4$ was 1.10 mol %. Then water was adsorbed and/or diffused under the same conditions a Example 6. This hBN sintered compact contained 0.12 wt. % of water ascertained by measuring the weight change. This sample was subjected to a superhigh pressure of 50 Kbar and a temperature of 1250° C. for 15 minutes.

Thus obtained was a dense cBN sintered compact of high purity. This cBN sintered compact was 3.48 in density equal to the theoretical value, its heat conductivity was 6.0 W/cm·°C. and its Vickers hardness was 6000 to 6500 Kg/mm².

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A method of manufacturing a sintered compact of cubic boron nitride, comprising the following steps:
    (a) introducing an alkaline earth metal boron nitride into a compact of hexagonal boron nitride,
    (b) introducing 0.005 to 1.000 percent by weight of water absorbed/diffused into said hexagonal boron nitride compact containing said alkaline earth metal boron nitride, said water improving the catalytic function of said alkaline earth metal boron nitride, said water suppressing an abnormal growth of cubic boron nitride particles, and
    (c) treating the so prepared hexagonal boron nitride compact under thermodynamically stable temperature and pressure conditions for forming a dense sintered cubic boron nitride compact, said water facilitating the sintering, whereby particles in said cubic boron nitride are strongly bonded to each other.

2. The method of claim 1, wherein said hexagonal boron nitride compact is prepared by a cold isostatic pressing of hexagonal boron nitride powder.

3. The method of claim 1, wherein the content of said alkaline earth metal boron nitride introduced into said hexagonal boron nitride compact is within a range of 0.01 to 5.00 mol %, wherein said alkaline earth metal boron nitride is expressed by $Me_3B_2N_4$, wherein Me is the alkaline earth metal.

4. The method of claim 1, wherein said treating step is performed at a temperature of 1200° C. or more.

5. The method of claim 1, wherein the amount of said alkaline earth metal boron nitride introduced into said hexagonal boron nitride compact is within a range of 0.1 to 2.0 mol % wherein said alkaline earth metal boron nitride is expressed by $Me_3B_2N_4$, wherein Me is the alkaline earth metal, and wherein said amount of water to be absorbed/diffused is within a range of 0.05 to 0.3 wt. %, and wherein said treatment step is performed at a temperature of 1400° C. or more.

6. The method of claim 1, wherein said absorbed/diffused water is introduced by placing a hexagonal boron nitride compact containing alkaline earth metal boron nitride into a closed vessel maintained at a constant temperature and humidity for a constant period of time.

7. The method of claim 1, wherein said hexagonal boron nitride compact is prepared by sintering hexagonal boron nitride powder.

* * * * *

UNITED STATES PATENT AND TRADEMARK OFFICE
CERTIFICATE OF CORRECTION

PATENT NO. : 4,772,575
DATED : September 20, 1988
INVENTOR(S) : Nobuhiro Ōta et al.

It is certified that error appears in the above-identified patent and that said Letters Patent is hereby corrected as shown below:

Claim 1, line 6, replace "absorbed" by --adsorbed--;
Claim 5, line 7, replace "absorbed" by --adsorbed--;
Claim 6, line 1, replace "absorbed" by --adsorbed--.

Signed and Sealed this

Twenty-fifth Day of April, 1989

Attest:

DONALD J. QUIGG

Attesting Officer     Commissioner of Patents and Trademarks